US012651405B2

(12) United States Patent　　　(10) Patent No.:　US 12,651,405 B2
Jia et al.　　　　　　　　　　　　(45) Date of Patent:　　Jun. 9, 2026

(54) GAZE-AWARE TONE MAPPING WITH ADAPTIVE SPARKLES

(71) Applicant: Meta Platforms Technologies, LLC, Menlo Park, CA (US)

(72) Inventors: Zhang Jia, San Jose, CA (US); Ajit Ninan, San Jose, CA (US); Tsz Tai Chan, Hong Kong (CN); Minchen Wei, Hong Kong (CN)

(73) Assignee: Meta Platforms Technologies, LLC, Menlo Park, CA (US)

( * ) Notice: Subject to any disclaimer, the term of this patent is extended or adjusted under 35 U.S.C. 154(b) by 248 days.

(21) Appl. No.: 18/124,320

(22) Filed: Mar. 21, 2023

(65) Prior Publication Data

US 2024/0320906 A1　　Sep. 26, 2024

(51) Int. Cl.
　　*G06T 17/00*　　　(2006.01)
　　*G06F 3/01*　　　(2006.01)
　　*G06T 7/62*　　　(2017.01)
　　*G06T 7/70*　　　(2017.01)
　　*G06V 10/60*　　　(2022.01)

(52) U.S. Cl.
　　CPC .............. *G06T 17/00* (2013.01); *G06F 3/013* (2013.01); *G06T 7/62* (2017.01); *G06T 7/70* (2017.01); *G06V 10/60* (2022.01); *G06V 2201/07* (2022.01)

(58) Field of Classification Search
None
See application file for complete search history.

(56) References Cited

U.S. PATENT DOCUMENTS 9,897,809　B2　　2/2018　Hue et al.
9,940,901　B2　　4/2018　Luebke et al.
10,120,194　B2　11/2018　Cobb et al.
10,621,708　B2　　4/2020　Malaika et al.
10,915,148　B1　　2/2021　Richards et al.
11,211,030　B2　12/2021　Bonnier et al.
(Continued)

OTHER PUBLICATIONS

European Search Report for European Patent Application No. 24157806.1, dated Jul. 11, 2024, 4 pages.
(Continued)

*Primary Examiner* — Kyle Zhai
(74) *Attorney, Agent, or Firm* — Greenberg Traurig, LLP

(57) ABSTRACT

Information relating to gaze direction is used, e.g., with other information, to perform tone mapping, brightness adaptation, and/or sparkle generation/management for virtual or augmented reality displays. For example, speed of light adaptation may be increased as a user's gaze moves from a darker scene to a brighter scene and decreased in opposite direction to match human perception dynamics in real world. Sparkles from smaller objects may be adjusted depending on an object size, a brightness of the object's background, and/or the object's location relative to the user's gaze—that is, whether the object in the user's focus or in a periphery. Specularity of the objects may be obtained from a specularity map (e.g., metadata associated with each object) or from image processing a scene. Local sparkles may be shimmered as the user's head rotates deterministically or randomly to provide a sense of real-life glistening.

20 Claims, 15 Drawing Sheets

(56) References Cited

U.S. PATENT DOCUMENTS

| | | | | |
|---|---|---|---|---|
| 2014/0252056 A1* | 9/2014 | Murray | .................. | B60R 9/042 |
| | | | | 224/310 |
| 2015/0123991 A1* | 5/2015 | Yarosh | .................. | H04N 7/141 |
| | | | | 345/629 |
| 2015/0325035 A1* | 11/2015 | Howell | .................. | G06T 15/06 |
| | | | | 345/426 |
| 2017/0287112 A1* | 10/2017 | Stafford | .................. | G06F 3/013 |
| 2020/0051212 A1* | 2/2020 | Kitajima | ................ | H04N 23/76 |
| 2020/0233681 A1 | 7/2020 | Garstenauer et al. | | |
| 2020/0265797 A1 | 8/2020 | Croxford | | |
| 2021/0096726 A1* | 4/2021 | Faulkner | ............ | G06F 3/04842 |
| 2021/0099632 A1 | 4/2021 | Molholm | | |
| 2021/0142031 A1* | 5/2021 | Tasdizen | ................ | G06T 7/194 |
| 2021/0233318 A1 | 7/2021 | Stolzenberg et al. | | |
| 2022/0091723 A1* | 3/2022 | Faulkner | ................ | G06F 3/017 |
| 2023/0114043 A1* | 4/2023 | Wan | .................. | G06F 3/04815 |
| | | | | 345/633 |
| 2023/0196657 A1* | 6/2023 | Ichiba | .................... | G06F 3/013 |
| | | | | 345/419 |
| 2023/0199420 A1* | 6/2023 | Dorn | ....................... | H04S 7/301 |
| | | | | 345/633 |

OTHER PUBLICATIONS

Jiddi S., et al., "Detecting Specular Reflections and Cast Shadows to Estimate Reflectance and Illumination of Dynamic Indoor Scenes," IEEE Transactions on Visualization and Computer Graphics, Feb. 28, 2020, vol. 28, No. 2, pp. 1249-1260.

Choi H-H., et al., "Tone Mapping of High Dynamic Range Images Combining Co-Occurrence Histogram and Visual Salience Detection," Applied Science, vol. 9, Issue 21, 2019, 20 pages.

Mantiuk R., et al., "Gaze-Dependent Tone Mapping," International Conference Image Analysis and Recognition, May 2013, pp. 426-433.

* cited by examiner

200C

200

LEFT SIDE
227

EYE TRACKING
SENSORS
212

FRONT SIDE
225

BODY
220

HEAD
STRAP
230

CAMERA
215

BOTTOM SIDE    DISPLAY
223              210

500
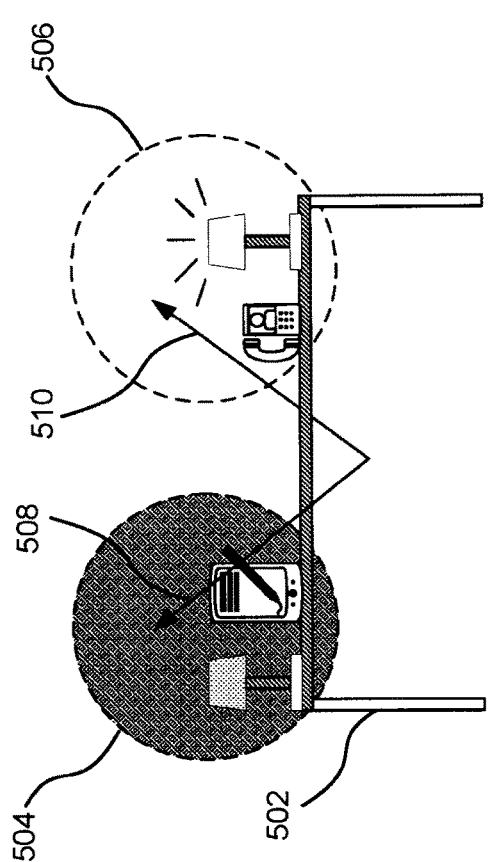
506
510
508
504
502
FIG. 5

600
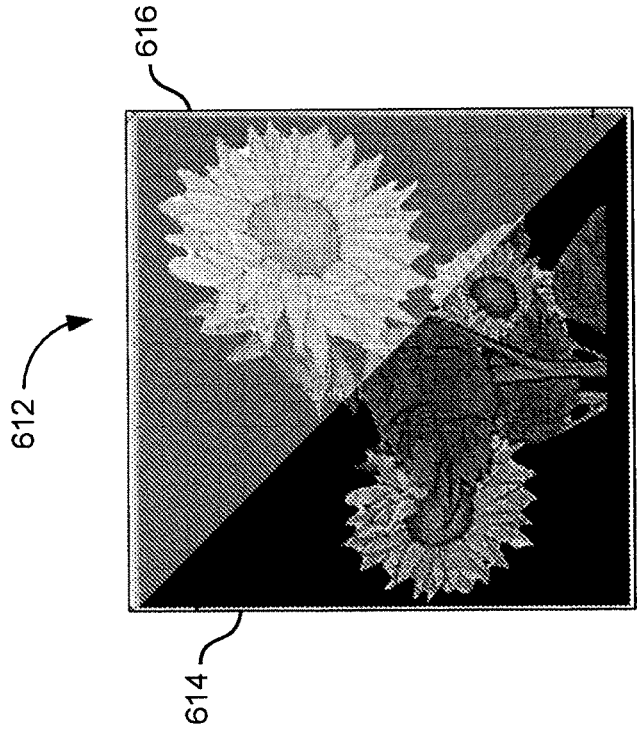
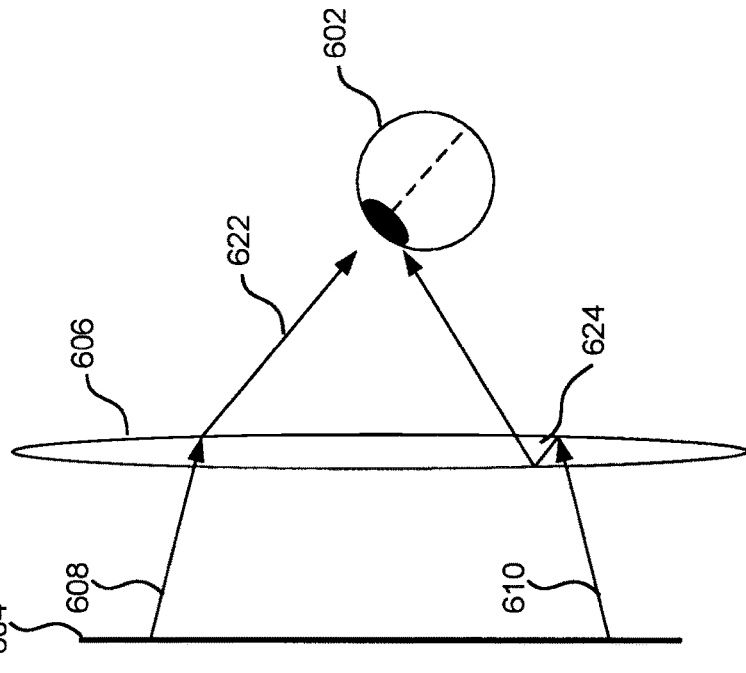
FIG. 6

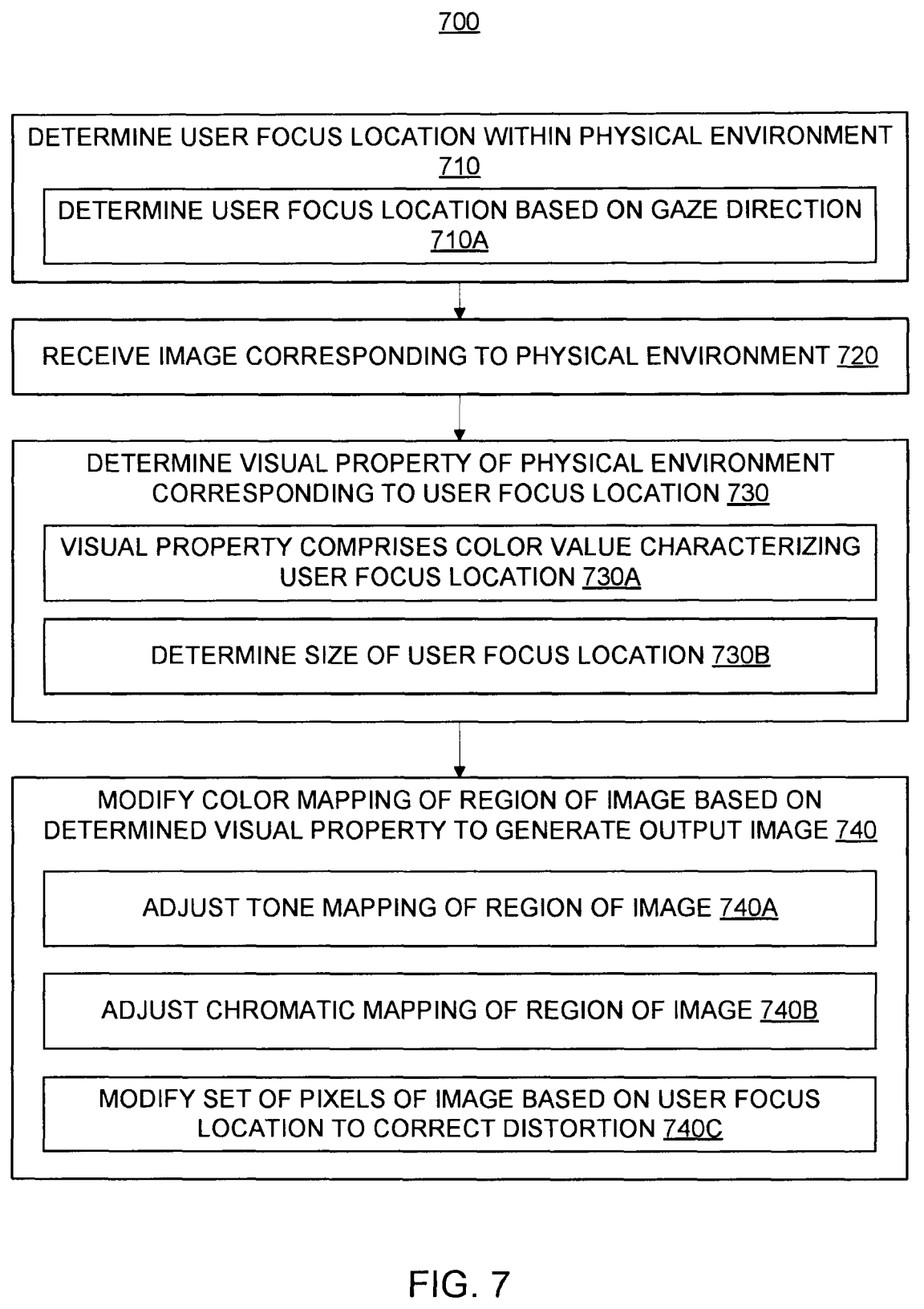

_700_

DETERMINE USER FOCUS LOCATION WITHIN PHYSICAL ENVIRONMENT _710_

DETERMINE USER FOCUS LOCATION BASED ON GAZE DIRECTION _710A_

RECEIVE IMAGE CORRESPONDING TO PHYSICAL ENVIRONMENT _720_

DETERMINE VISUAL PROPERTY OF PHYSICAL ENVIRONMENT CORRESPONDING TO USER FOCUS LOCATION _730_

VISUAL PROPERTY COMPRISES COLOR VALUE CHARACTERIZING USER FOCUS LOCATION _730A_

DETERMINE SIZE OF USER FOCUS LOCATION _730B_

MODIFY COLOR MAPPING OF REGION OF IMAGE BASED ON DETERMINED VISUAL PROPERTY TO GENERATE OUTPUT IMAGE _740_

ADJUST TONE MAPPING OF REGION OF IMAGE _740A_

ADJUST CHROMATIC MAPPING OF REGION OF IMAGE _740B_

MODIFY SET OF PIXELS OF IMAGE BASED ON USER FOCUS LOCATION TO CORRECT DISTORTION _740C_

FIG. 7

800
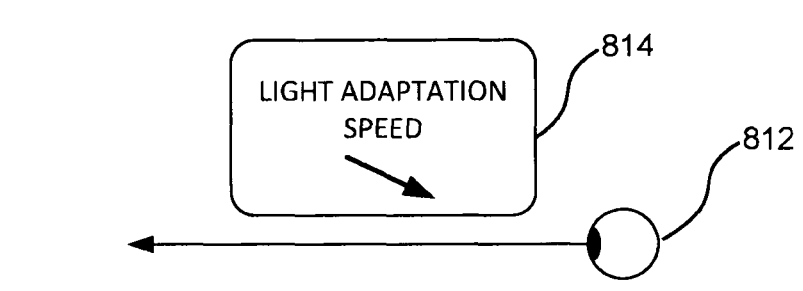
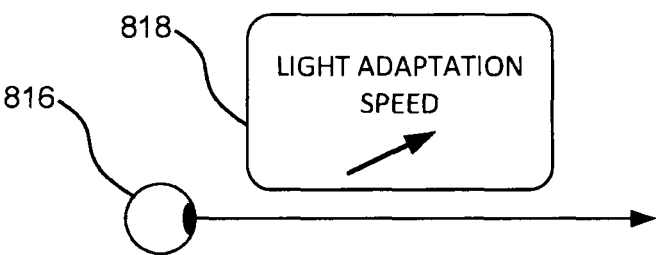
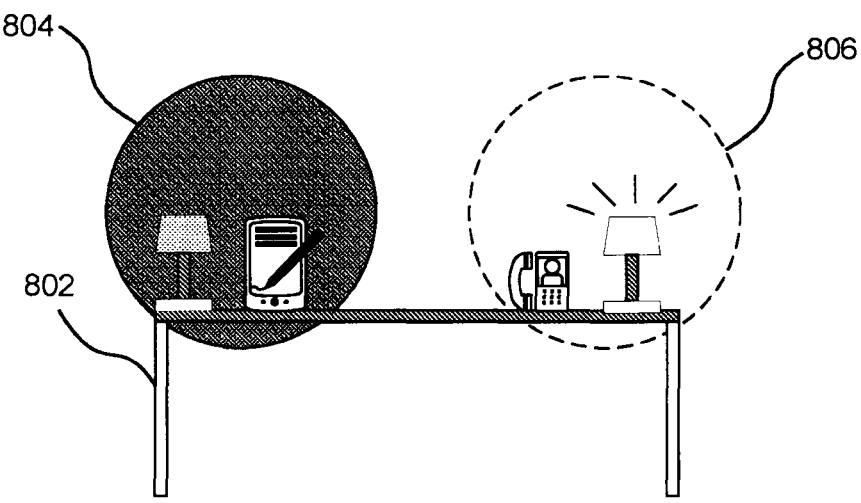
FIG. 8

900A

900B

900C
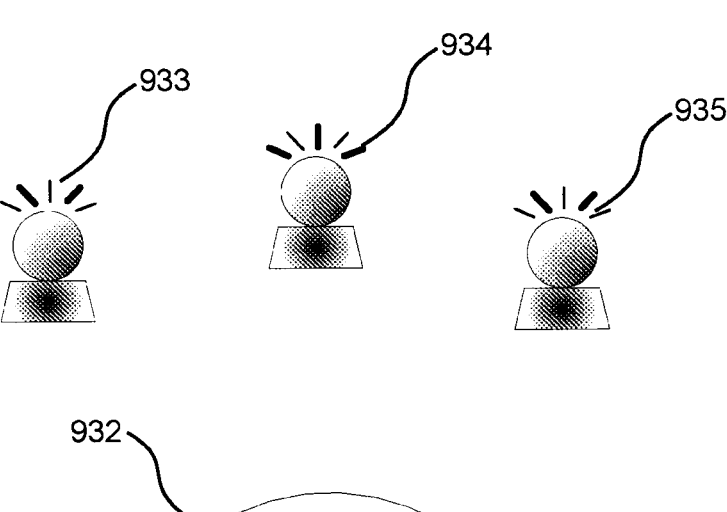
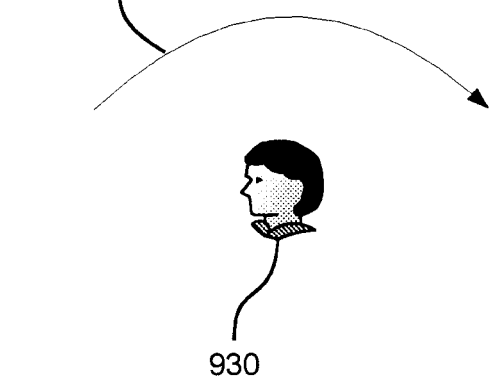
FIG. 9C

1000

DETECT GAZE, FOCUS LOCATION, HEAD MOVEMENT, SCENE BRIGHTNESS, AND/OR OBJECT SIZES
1002

RECEIVE SPECULARITY MAP
1004

DETERMINE LIGHT ADAPTATION SPEED
1006

DETERMINE SPARKLE AREA, SHIMMER
1008

PRESENT VIRTUAL OR AUGMENTED REALITY SCENE
1010

GAZE-AWARE TONE MAPPING WITH ADAPTIVE SPARKLES

TECHNICAL FIELD

This patent application relates generally to display image rendering techniques, and more specifically, to systems and methods using gaze-aware tone mapping with adaptive sparkles.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user. A head-mounted display (HMD) device may offer a wider field of view (FOV) than other displays. Due to optical design and hardware limitations, however, achieving uniform color across the field of view can be difficult. For example, some display hardware may exhibit color changes when viewed from different viewing angles. Optical layers and/or lenses between the display hardware and the user's eye may also exhibit color changes when viewed from different viewing angles.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 5 is a diagram illustrating tone mapping including brightness adjustment, according to an example.

FIG. 6 illustrates a diagram of an example of veiling glare.

FIG. 7 is a flow diagram illustrating an example method for using gaze-aware tone mapping and chromatic adaptation, according to some examples.

FIG. 8 illustrates variation of light adaptation speed according to gaze movement, according to examples.

FIGS. 9A-9D illustrate various techniques of generating sparkles, according to examples.

DETAILED DESCRIPTION

Figure 1:
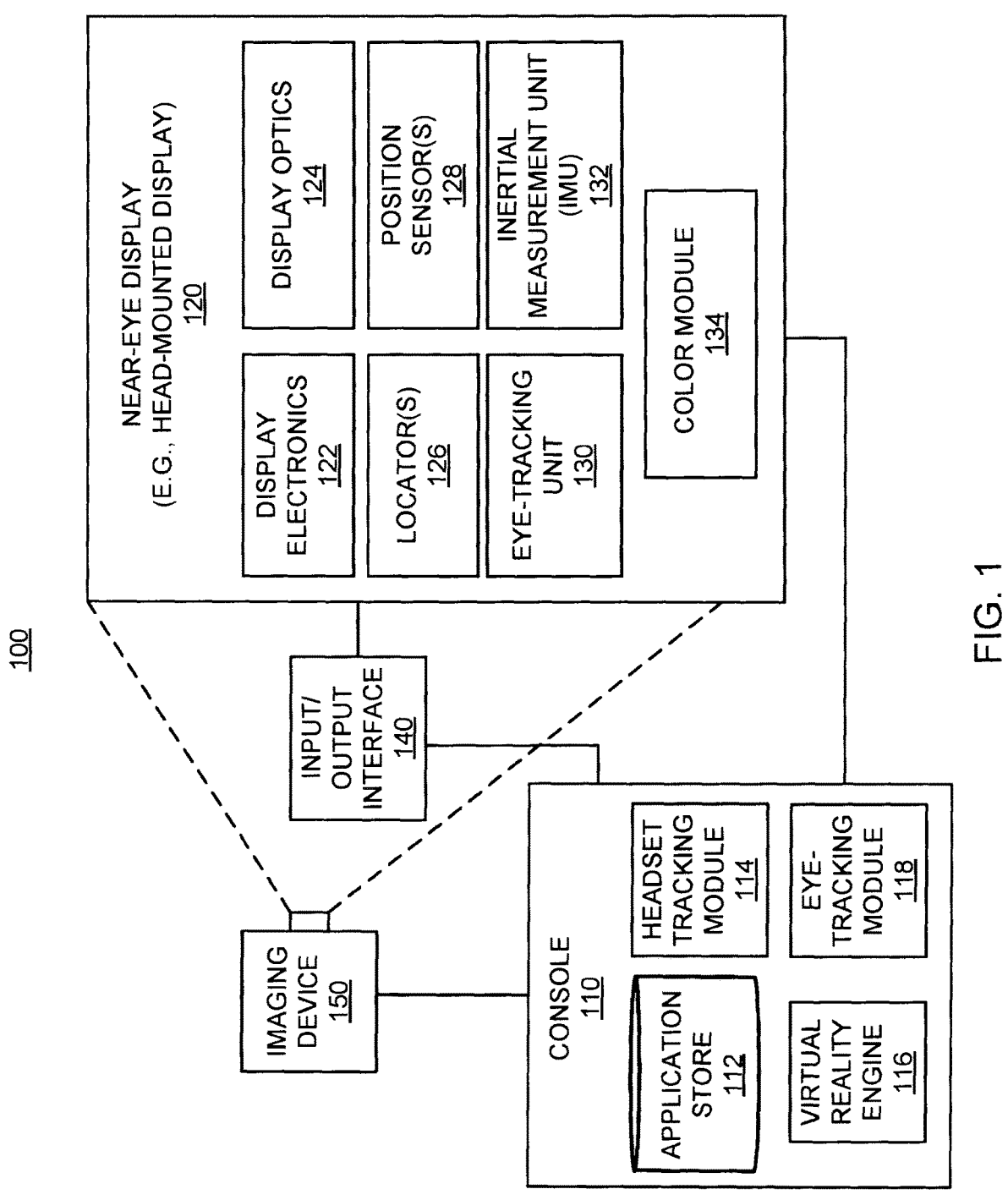
FIG. 1 illustrates a block diagram of an artificial reality system environment including a near-eye display device, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Virtual reality (VR) and augmented reality (AR) displays may offer a significantly wider field of view (FOV) than traditional displays, creating an immersive experience for a user. However, due to optical design and hardware limitations, it may be difficult to achieve uniform color across the field of view. For example, display hardware, such as organic light emitting diodes (OLEDs), may exhibit changes in perceived color when viewed from different viewing angles. Optical layers and/or lenses between the display and the human eye may also contribute to color distortion. As another example, viewing optics in virtual reality (VR) systems (e.g., pancake optics) may exhibit ghosting and veiling glare issues due to complex optical layers and coatings.

In some examples of the present disclosure, information relating to gaze direction may be used, e.g., with other information, to perform tone mapping, brightness adaptation, and/or sparkle generation/management. For example, speed of light adaptation (change in tone mapping adjustment) may be increased as a user's gaze moves from a darker scene to a brighter scene and decreased as the user's gaze moves from a brighter scene to a darker scene to match human perception dynamics in real world. Sparkles from smaller objects may be adjusted (i.e., enhanced or reduced) depending on an object size, a brightness of the object's background, and/or the object's location relative to the user's gaze—that is, whether the object in the user's focus or in a periphery. Specularity of the objects may be obtained from a specularity map (e.g., metadata associated with each object) or from image processing a scene. Local sparkles may be shimmered as the user's head rotates deterministically or randomly to provide a sense of real life glistening.

In other example, information relating to gaze direction may be used, e.g., with other information, to perform color correction in a virtual reality (VR), augmented reality (AR), or mixed reality (MR) environment. For example, a region in a field of view of a displayed virtual reality (VR) environment may be characterized by bright content. In some examples, the brightness of the region may be modified, e.g., adjusted downward, based on a user focus location toward which the user's gaze is directed. The brightness of the region may be modified based on the optical design of the head-mounted display (HMD) device. As another example, the user focus location may be used as a reference for chromatic adaptation of the region, e.g., adjusting a white point of the region so that the color appearance of the region is representative of the color appearance of a corresponding physical environment.

While some advantages and benefits of the present disclosure are apparent, other advantages and benefits may include providing realistic virtual environment experience to users without expensive and complex physical components, enhancement of displayed scene accuracy, and user comfort when experiencing virtual or augmented reality presentations.

FIG. 1 illustrates a block diagram of an artificial reality system environment 100 including a near-eye display device, according to an example. As used herein, a "near-eye display device" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display device."

As shown in FIG. 1, the artificial reality system environment 100 may include a near-eye display device 120, an optional external imaging device 150, and an optional input/output interface 140, each of which may be coupled to a console 110. The console 110 may be optional in some instances as the functions of the console 110 may be integrated into the near-eye display device 120. In some examples, the near-eye display device 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display device 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display device 120 may be implemented in any suitable form-factor, including a head-mounted display (HMD), a pair of glasses, or other similar wearable eyewear or device. Examples of the near-eye display device 120 are further described below with respect to FIGS. 2 and 3. Additionally, in some examples, the functionality described herein may be used in a head-mounted display (HMD) or headset that may combine images of an environment external to the near-eye display device 120 and artificial reality content (e.g., computer-generated images). Therefore, in some examples, the near-eye display device 120 may augment images of a physical, real-world environment external to the near-eye display device 120 with generated and/or overlaid digital content (e.g., images, video, sound, etc.) to present an augmented reality to a user.

In some examples, the near-eye display device 120 may include any number of display electronics 122, display optics 124, and an eye tracking unit 130. In some examples, the near-eye display device 120 may also include one or more locators 126, one or more position sensors 128, an inertial measurement unit (IMU) 132, and a wireless communication subs-system 134. In some examples, the near-eye display device 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display device 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display device 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display device 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display device 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display device 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display device 120 that may be relative to an initial position of the near-eye display device 120. For example, the inertial measurement unit (IMU) 132 may integrate measurement signals received from accelerometers over time to estimate a velocity vector and integrate the velocity vector over time to determine an estimated position of a reference point on the near-eye display device 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display device 120 for presentation to the user in accordance with information received from one or more of external imaging device 150, the near-eye display device 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display device 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the virtual reality engine 116 may execute applications within the artificial reality system environment 100 and receive position information of the near-eye display device 120, acceleration information of the near-eye display device 120, velocity information of the near-eye display device 120, predicted future positions of the near-eye display device 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display device 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display device 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2A:
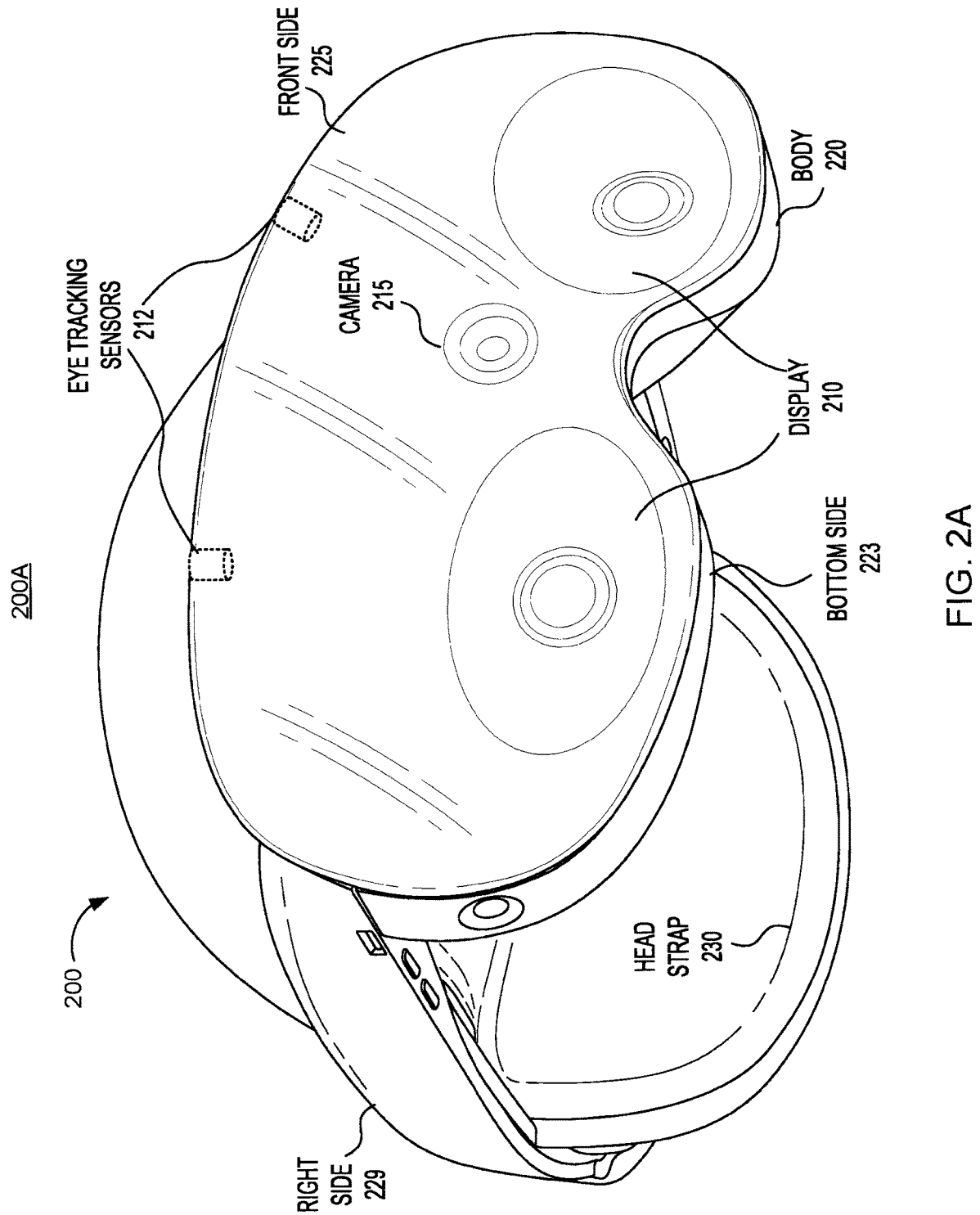
FIGS. 2A through 2C illustrate various views of a near-eye display device in the form of a head-mounted display (HMD) device, according to an example.
Figure 2B:
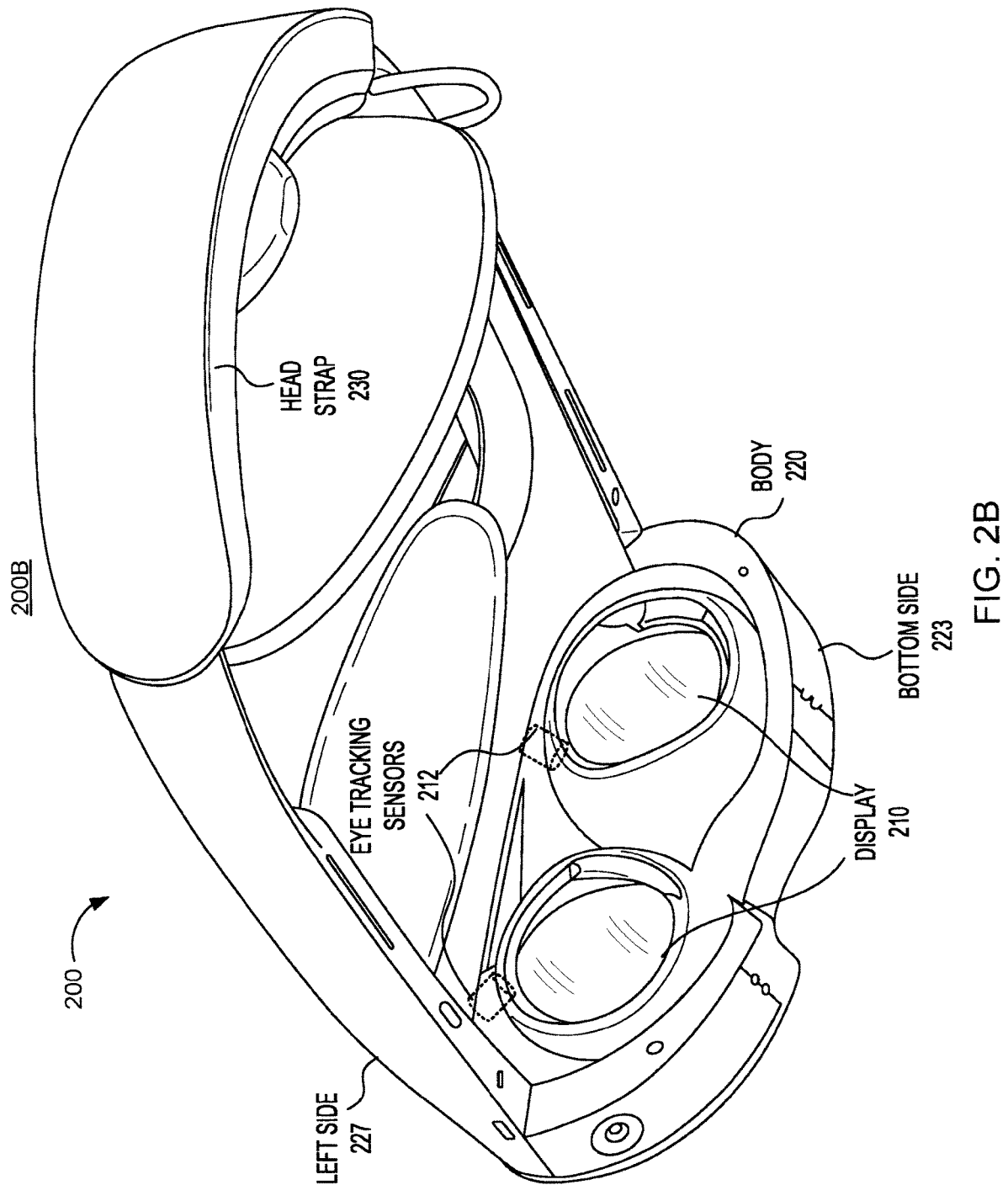
Figure 2C:
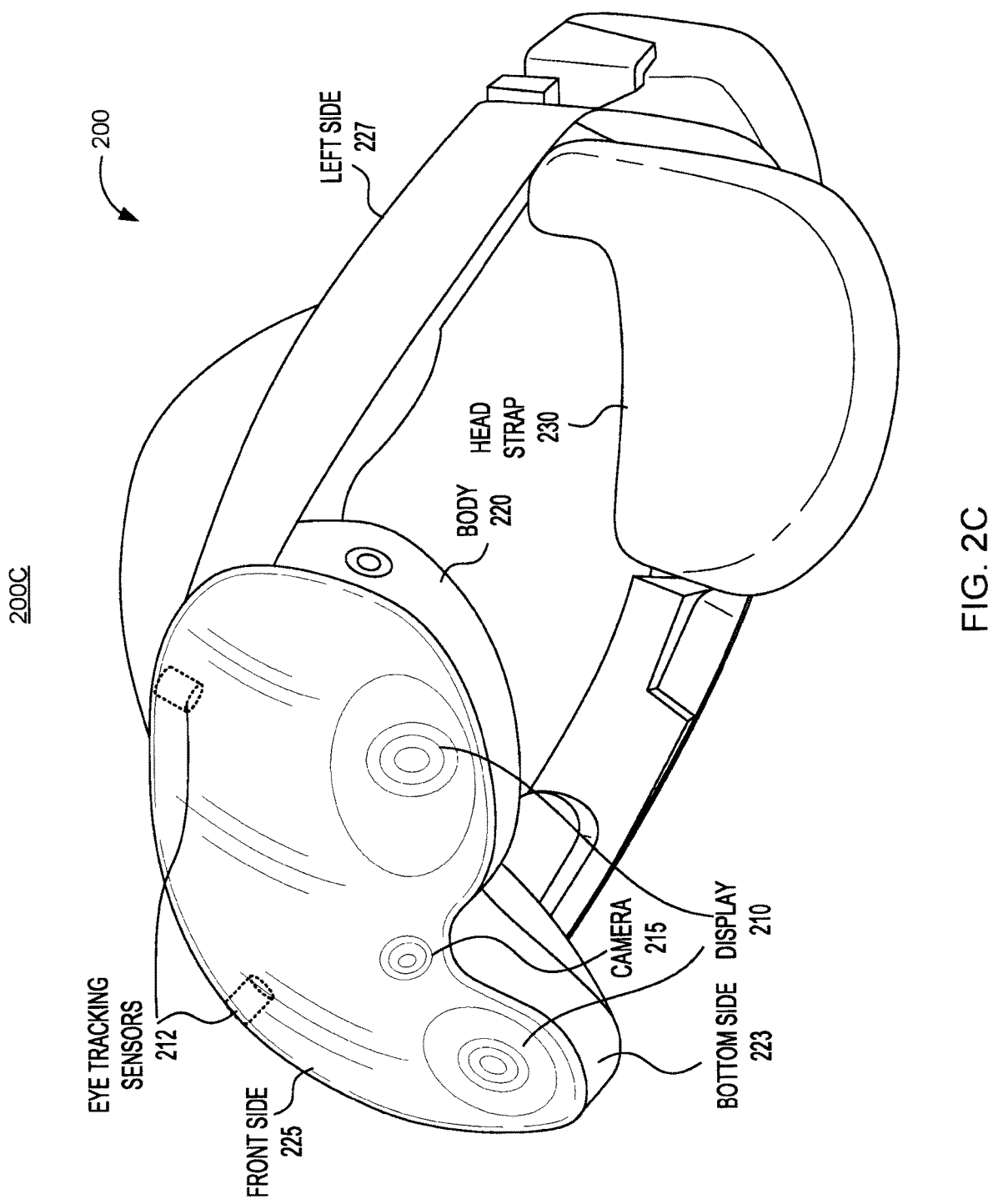

FIGS. 2A through 2C illustrate various views of a near-eye display device in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIGS. 2A, 2B, and 2C show a bottom side 223, a front side 225, a right side 229, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown) enclosed in the body 220 of the head-mounted display (HMD) device 200. Images of video of the real (physical) environment around the user may also be captured through an image capture device such as camera 215 and presented as part of an augmented reality (AR) scene superimposed with virtual object(s).

In some examples, the head-mounted display (HMD) device 200 may include various sensors (not shown), such as depth sensors, motion sensors, position sensors, and/or eye tracking sensors 212. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
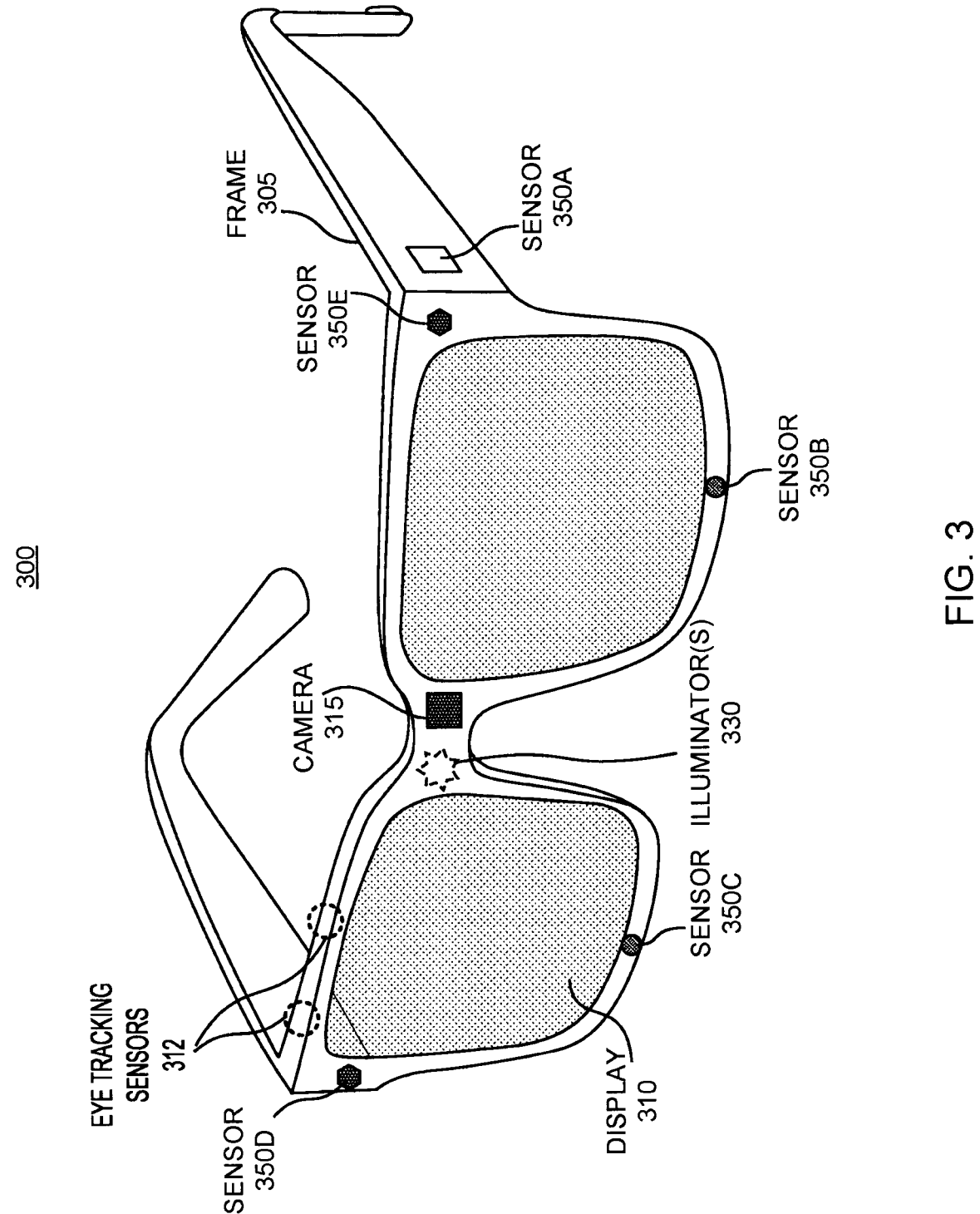
FIG. 3 illustrates a perspective view of a near-eye display device in the form of a pair of glasses, according to an example.

FIG. 3 is a perspective view of a near-eye display device 300 in the form of a pair of glasses (or other similar eyewear), according to an example. In some examples, the near-eye display device 300 may be a specific example of near-eye display device 120 of FIG. 1 and may be configured to operate as a virtual reality display, an augmented reality (AR) display, and/or a mixed reality (MR) display.

In some examples, the near-eye display device 300 may include a frame 305 and a display 310. In some examples, the display 310 may be configured to present media or other content to a user. In some examples, the display 310 may include display electronics and/or display optics, similar to components described with respect to FIGS. 1 and 2A-2C. For example, as described above with respect to the near-eye display device 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 310 may include a projector, or in place of the display 310 the near-eye display device 300 may include a projector.

In some examples, the near-eye display device 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display device, and/or to provide an interactive virtual reality (VR), augmented reality (AR), and/or mixed reality (MR) experience to a user of the near-eye display device 300. In some examples, the various sensors 350*a*-350*e* may also be used for stereoscopic imaging or other similar applications.

In some examples, the near-eye display device 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1 and 2A-2C.

In some examples, the near-eye display device 300 may also include a camera 315 or other image capture unit. The camera 315, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display device 300 may also include eye tracking sensors 312.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

In some examples, the image processing and eye position/orientation determination functions may be performed by a central controller, not shown, of the near-eye display device 300. The central controller may also provide control signals to the display 310 to generate the images to be displayed to the user, depending on the determined eye positions, eye orientations, gaze directions, eyes vergence, etc.

Figure 4:
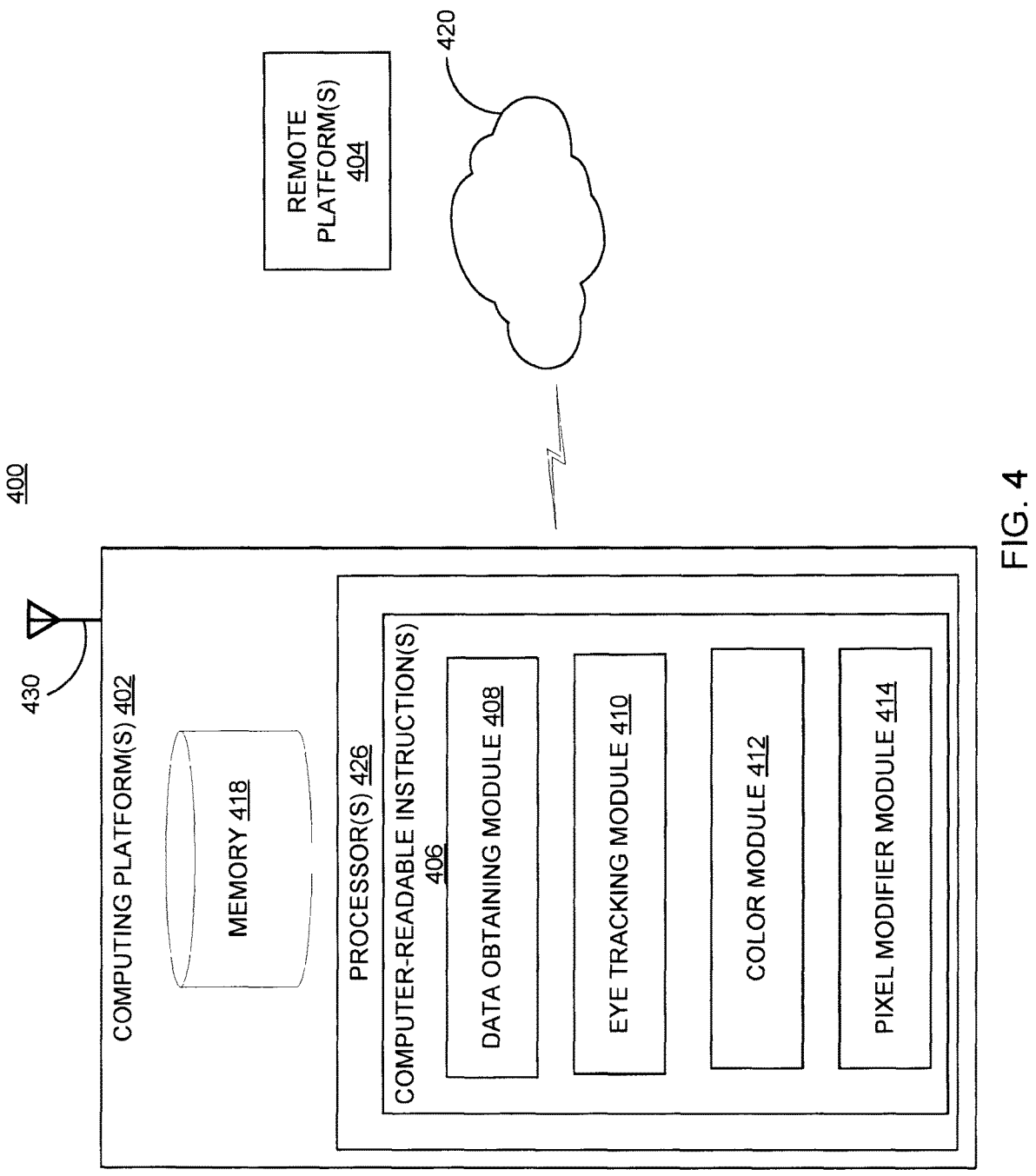
FIG. 4 illustrates a block diagram of a tone mapping system, according to an example.

FIG. 4 illustrates a block diagram of a tone mapping system, according to an example. The tone mapping system 400 may include one or more computing platforms 402. The one or more computing platforms 402 may be communicatively coupled with one or more remote platforms 404 over network(s) 420 (e.g., using wireless communication antenna 430). In some examples, users may access the tone mapping system 400 via the remote platforms 404.

In some examples, the one or more computing platforms 402 may be configured by computer-readable instructions 406 stored in memory 418 and executed by processor(s) 426. Computer-readable instructions 406 may include modules. The modules may be implemented as one or more of functional logic, hardware logic, electronic software modules, and the like. The modules may include one or more of a data obtaining module 408, an eye tracking module 410, a color module 412, and a pixel modifier module 414.

In some examples, the data obtaining module 408 may receive an image corresponding to a physical environment, e.g., in which the tone mapping system 400 is located. For example, the tone mapping system 400 may be embodied in a head-mounted display (HMD) device. The head-mounted display (HMD) device may include one or more camera(s) or image sensor(s) that capture images representing the physical environment. The images may be still images. The images may be frames extracted from a video feed. The head-mounted display (HMD) device may include a display (e.g., a screen) that displays the images or modified images.

In some examples, the eye tracking module 410 may determine a user focus location within the physical environment on which the user's attention is focused. The tone mapping system 400 may use gaze direction as a proxy for the user's attention, e.g., the tone mapping system 400 may determine that the user's attention is focused on a location at which the user's gaze is directed. In some examples, the tone mapping system 400 may determine the user focus location based at least in part on other proxies for the user's attention, such as a location of a hand gesture or a location of a pointing device. As another example, the tone mapping system 400 may determine the user focus location based at least in part on the location of an object that is present in the physical environment. For example, if a prominent object is in the physical environment, the tone mapping system 400 may determine that tone mapping should be centered on that object, even if the user may not be looking at the object. In some examples, the eye tracking module 410 determines a gaze direction of the user. For example, the eye tracking module 410 may receive image data from user-facing cameras or image sensors. The image data may represent an image or images that include pixels representing the user's pupils. Based on the position of the user's pupils, the eye tracking module 410 may determine the direction of the user's gaze. In some examples, the user's eyes may be illuminated, for example, by LASER or near infrared (nIR) illumination sources, such as light emitting diodes (LEDs). The image represented by the image data may include pixels representing reflections from the user's eyes (e.g., glints) that may be used to determine the direction of the user's gaze.

In some examples, the color module 412 determines a visual property of the physical environment corresponding to the user focus location. For example, the color module 412 may receive image data representing the physical environment from a world-facing camera or image sensor. The color module 412 may analyze color values associated with one or more pixels in the image data to determine a color value associated with the user focus location in the physical environment to which the user's gaze is directed. The brightness of the user focus location may be determined.

In some examples, the color module 412 may select a size of the user focus location. For example, the color module 412 may select a size of the area that is to serve as a basis for tone mapping and/or chromatic adaptation. In some examples, the color module 412 may apply an averaging or filtering function to the image data representing the physical environment. For example, the color module 412 may apply a filtering function to account for noise and/or natural micro saccade from the eye tracker. In some examples, the color module 412 may differentiate between different eye movements such as saccade, micro saccade, slow pursuit, and/or vestibulo ocular reflex (VOR). The color module 412 may apply different filtering functions to account for each type of eye movement. For example, the color module 412 may apply little or no averaging to the image data in the case of saccade so that changes may be applied more quickly.

In some examples, the pixel modifier module 414 modifies a tone mapping of a region of the image corresponding to the physical environment based on the determined visual property to generate an output image. For example, the pixel modifier module 414 may use the color values from the area around the user focus location to perform tone mapping on a region of the image.

In some examples, modifying the color mapping may include modifying a tone mapping of the region of the image. For example, the pixel modifier module 414 may perform dynamic brightness adjustment.

FIG. 5 is a diagram illustrating tone mapping including brightness adjustment, according to an example. Diagram 500 illustrates an example virtual reality (VR) representation of the real world scene comprising a desk 502 with objects such as a telephone, a pad, two lamps. The scene in diagram 500 includes two different portions, a right portion 506 is more brightly illuminated compared to a left portion 504. It will be appreciated that a dynamic range of an image of the scene is reduced in the left portion 504 compared to the right portion 506. Some displays for high dynamic range (HDR) images are capable of high absolute brightness (e.g., nits). In some examples, dynamic brightness adjustment may be performed without the need for a display with high absolute brightness capabilities.

For example, as represented in the diagram 500, the eye tracking module 410 may determine that the user's gaze 508 is directed to the left portion 504. The pixel modifier module 414 may modify the tone mapping of the image based on an area around the user focus location (left portion 504). Because the area around the user focus location (left portion 504) is relatively dark, the pixel modifier module 414 may modify the tone mapping of image to increase the brightness of image. Similarly, because the area around a user focus location 510 (left portion 506) is relatively bright, the pixel modifier module 414 may modify the tone mapping of image to decrease the brightness of image.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. In some examples, brightness correction may be implemented as part of color correction. Brightness correction may be achieved by emission duty or persistence adjustment and/or backlight spatial adjustment. For example, within each frame (e.g., 90 frames per second (fps) for virtual reality), the display or backlight may not be constantly on. The display or backlight may have a duty cycle of, for example, 10% (e.g., 1 ms), 20%, or 30%. In some examples, backlight spatial adjustment may be achieved by spatially varying the brightness across the surface of the display. This may be achieved in a backlight with arrayed LEDs. Brightness correction may be spatially slow, e.g., there may be few or no sharp corrections. In some examples, brightness correction may be performed every 10° across the field of view (FOV) with a smooth transition, such as a B spline surface, e.g., the surface 810 of FIG. 8.

FIG. 6 illustrates a diagram of an example of veiling glare. As illustrated in diagram 600, an eye 602 perceiving content on a display 604 through a lens 606 may perceive the content at a user focus location 608. High brightness content at another location 610 may result in the veiling glare effect 624. An example image 612 includes a portion 614 without the veiling glare effect 624 and a portion 616 with the veiling glare effect 624. In some examples, the pixel modifier module 414 may adjust the color values of at least part of the image to counteract the veiling glare effect based on the user focus location 622. For example, the veiling glare effect 624 may be generated by a bright signal from a peripheral direction, as shown at the left side of the diagram 600. If it is known that the user is not looking directly at the bright signal, the color values of the part of the image corresponding to the bright signal may be adjusted to dim the bright signal. This may reduce the veiling glare effect 624.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. Color correction may be applied on a per frame basis across the display area, based on the user focus location (e.g., gaze direction). In some examples, the color correction may be spatially slow, e.g., there may be few or no sharp corrections. In some examples, color correction may be performed every 10° across the field of view (FOV) with a smooth transition, such as a B spline surface.

FIG. 7 is a flow diagram illustrating an example method 700 for using gaze-aware tone mapping and chromatic adaptation, according to some examples. In various examples, the method 700 is performed by a device (e.g., the tone mapping system 400 of FIG. 4). In some examples, the method 700 is performed by processing logic, including hardware, firmware, software, or a combination thereof. The method 700 may be performed by a processor executing code stored in a non-transitory computer-readable medium (e.g., a memory). Briefly, in various examples, the method 700 may include determining a user focus location within a physical environment and receiving an image corresponding to the physical environment. A visual property of the physical environment corresponding to the user focus location may be determined. A color (or tone) mapping of a region of the image may be modified based on the determined visual property to generate an output image.

As represented by block 710, in various examples, the method 700 may include determining a user focus location within a physical environment. For example, the tone mapping system 400 may determine a location in the physical environment to which the user's attention is directed. Gaze direction may be used as a proxy for the user's attention. For example, the tone mapping system 400 may determine that the user's attention is focused on a location at which the user's gaze is directed. As represented by block 710a, in some examples, the eye tracking module 410 may determine the user focus location based on a gaze direction. The eye tracking module 410 may determine the gaze direction of the user based on image data representing the user's eyes. For example, the eye tracking module 410 may receive image data from user-facing cameras or image sensors. The image data may represent an image or images that include pixels representing the user's pupils. Based on the position of the user's pupils, the eye tracking module 410 may determine the direction of the user's gaze. In some examples, the user's eyes may be illuminated, for example, by LASER or near infrared (nIR) illumination sources, such as light emitting diodes (LEDs). The image represented by the image data may include pixels representing reflections from the user's eyes (e.g., glints) that may be used to determine the direction of the user's gaze.

As represented by block 720, in various examples, the method 700 may include receiving an image corresponding to the physical environment. For example, the color module 412 may receive image data representing the physical environment from a world-facing camera or image sensor. Due to optical design and hardware limitations, the user's view of the physical environment may differ from the image. For example, it may be difficult to achieve uniform color across the field of view of a displayed representation of the physical environment. For example, display hardware, such as organic light emitting diodes (OLEDs), may exhibit changes in perceived color when viewed from different viewing angles. Optical layers and/or lenses between the display and the human eye may also contribute to color distortion. As another example, viewing optics in virtual reality (VR)

systems (e.g., pancake optics) may exhibit ghosting and veiling glare issues due to complex optical layers and coatings.

As represented by block 730, in various examples, the method 700 may include determining a visual property of the physical environment corresponding to the user focus location. In some examples, as represented by block 730*a*, the visual property may include a color value characterizing the user focus location. For example, the color module 412 may analyze color values associated with one or more pixels in the image data to determine a color value associated with the location in the physical environment to which the user's gaze is directed. In some examples, the visual property may include a brightness value characterizing the user focus location. For example, brightness may be determined based on RGB values of pixels in a selected area.

In some examples, as represented by block 730*b*, the method 700 may include determining a size of the user focus location. For example, the color module 412 may select a size of the area that is to serve as a basis for tone mapping and/or chromatic adaptation. In some examples, the color module 412 may apply an averaging or filtering function to the image data representing the physical environment. For example, the color module 412 may apply a filtering function to account for noise and/or natural micro saccade from the eye tracker. In some examples, the color module 412 may differentiate between different eye movements such as saccade, micro saccade, slow pursuit, and/or vestibulo ocular reflex (VOR). The color module 412 may apply different filtering functions to account for each type of eye movement. For example, the color module 412 may apply little or no averaging to the image data in the case of saccade so that changes may be applied more quickly.

As represented by block 740, in various examples, the method 700 may include modifying a color mapping of a region of the image corresponding to the physical environment based on the determined visual property to generate an output image. For example, the pixel modifier module 414 may use the color values from the area around the user focus location to perform color correction on a region of the image.

In some examples, as represented by block 740*a*, modifying the color mapping may include adjusting a tone mapping of the region of the image. For example, the pixel modifier module 414 may perform dynamic brightness adjustment, as described herein in connection with FIG. 5.

Due to optical design and hardware limitations, it may be difficult to achieve uniform color across the field of view (FOV). Display hardware (e.g., organic light emitting diodes (OLEDs)) may exhibit color changes when viewed from different viewing angles. In some examples, brightness correction may be implemented as part of color correction. Brightness correction may be achieved by emission duty or persistence adjustment and/or backlight spatial adjustment. Brightness correction may be spatially slow, e.g., there may be few or no sharp corrections. In some examples, brightness correction may be performed every 10° across the field of view (FOV) with a smooth transition, such as a B spline surface.

In some examples, as represented in block 740*b*, modifying the color mapping may include adjusting a chromatic mapping of the region of the image. For example, the pixel modifier module 414 may perform local white balancing (e.g., adjust a white point) based on an area around the user focus location.

In some examples, due to optical design and hardware limitations, it may be difficult to achieve uniform color across the field of view (FOV). Display hardware (e.g., organic light emitting diodes (OLEDs)) may exhibit color changes when viewed from different viewing angles. Color correction may be applied on a per frame basis across the display area, based on the user focus location (e.g., gaze direction). In some examples, the color correction may be spatially slow, e.g., there may be few or no sharp corrections. In some examples, color correction may be performed every 10° across the field of view (FOV) with a smooth transition, such as a B spline surface.

In some examples, the pixel modifier module 414 may use user focus location (e.g., gaze direction) information to perform dynamic color correction (DCC) and dynamic brightness correction (DBC) on an image. As represented in block 740*c*, the method 700 may include modifying a set of pixels of the image based on the user focus location to correct distortion. Distortion (e.g., pupil swim) may be introduced instability or exacerbated to achieve other benefits, such as higher resolution or more accurate color in the center field of view (FOV). The pixel modifier module 414 may compensate for distortion instability associated with changes in user focus location (e.g., gaze direction) by dynamic distortion correction (DDC). In some examples, dynamic distortion correction (DDC) focuses on peripheral minor adjustments with a large spatial size. A base distortion may be present, e.g., to present a barrel-shaped display pattern to achieve a regular angular space through the lens. Dynamic color correction (DCC), dynamic brightness correction (DBC), and/or dynamic distortion correction (DDC) may be applied on top of this base distortion correction.

Dynamic color correction (DCC), dynamic brightness correction (DBC), and/or dynamic distortion correction (DDC) may be performed by software, by a display driver integrated circuit (DDIC), and/or by a system on a chip (SOC), which may include a central processing unit (CPU) and a graphical processing unit (GPU).

FIG. 8 illustrates variation of light adaptation speed according to gaze movement, according to examples. Diagram 800 shows a scene comprising a desk 802 with objects thereon, where a right portion 806 of the scene is brighter (through illumination by a lamp, for example) compared to a left portion 804 of the scene. A light adaptation speed (e.g., tone mapping adjustment) may be increased (818) as a user gaze moves from left to right (816). The light adaptation speed may also be decreased (814) as the user gaze moves from right to left (812).

In some examples, the speed for light adaptation may be adjusted based on the direction. When the user's gaze moves from a brighter scene (or object(s)) to a darker scene (or object(s)), a slightly slower change may be used in the gaze HIGH DYNAMIC RANGE (HDR) or tone mapping adjustment. When the user's gaze moves from a darker scene (or object(s)) to a brighter scene (or object(s)), a slightly faster change may be used in the gaze high dynamic range (HDR) or tone mapping adjustment matching human perception dynamics in real world.

Figure 9A:
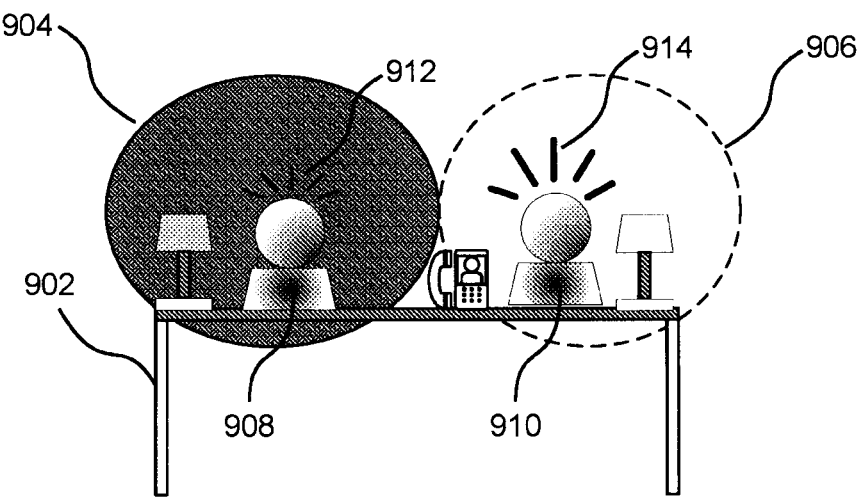

FIGS. 9A-9D illustrate various techniques of generating sparkles, according to examples. Diagram 900A in FIG. 9A shows a scene comprising a desk 902 with objects such as a telephone, lamps, a first ornament 908 and a second ornament 910 on it. A left portion 904 of the scene may be darker compared to a right portion 906 of the scene. In some examples, specular reflection 912 (sparkles) of the first ornament 908 in the darker left portion 904 may be lower than a specular reflection 914 of the ornament 910 in the brighter right portion 906.

Sparkles are relatively small areas of high brightness due to specular reflection in a scene enhancing a perception of reality in a virtual reality (VR) display. While most traditional displays can only replicate a fraction of the smaller simultaneous range, high dynamic range (HDR) displays may support luminance and contrast ranges closer to perceptual limits. In some examples, capabilities of high dynamic range (HDR) display may be taken advantage of to enhance a reality perception of a virtual or augmented reality scene displayed to a user. For example, a sparkle area associated with an object may be increased if the background of that object is brighter than an average brightness of the displayed scene (e.g., specular reflection 914 in the right portion 906). In contrast, the sparkle area associated with an object in a darker environment may be decreased if the background of that object is darker than the average brightness of the displayed scene (e.g., specular reflection 912 in the right portion 904).

Figure 9B:
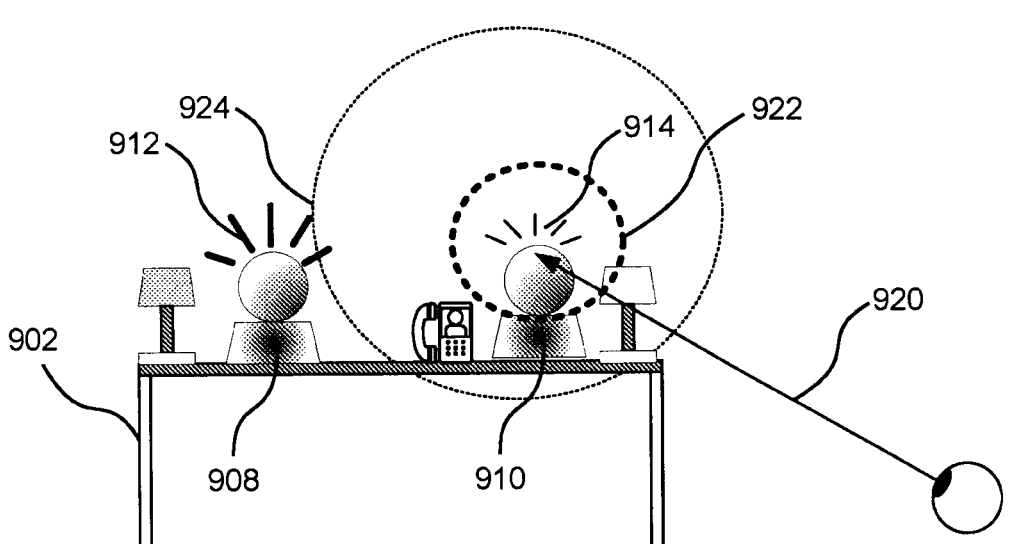

Diagram 900B in FIG. 9B shows a scene comprising the desk 902 with objects such as a telephone, lamps, the first ornament 908 and the second ornament 910 on it. The second ornament 910 with its specular reflection 914 is shown in the diagram 900B as being within a gaze focus area 922 of a user with a gaze 920, while the first ornament 908 with its specular reflection 912 is at a periphery 924 of the user's gaze focus area.

Increasing the sparkle area (i.e., specular reflection) of an object within the user's faze focus area may cause distraction. However, increasing the sparkle area of objects at the periphery of the user's gaze focus area may enhance the user's reality perception by making the objects more realistic. For example, pearl decorations on clothes, eyes, metallic objects, and similar ones may be presented with natural looking specular reflection. In some examples, a controller may detect objects at the periphery of the user's gaze focus area and increase their specular reflections (sparkle areas) to enhance the reality perception effect. As the user's gaze moves and the periphery of their gaze focus area changes, objects whose sparkle area is increased may be dropped from a list of objects to be enhanced (specular reflection-wise) and new objects may be added to the list.

Diagram 900C in FIG. 9C shows a head 930 of a user rotating along a rotation direction 932 and three example objects: first, second, and third ornaments with respective specular reflections 933, 934, and 935 coming into view of the user as their head 930 rotates.

As mentioned herein, a head-mounted display (HMD) device may detect movements of a head such as rotation and direction through one or more sensors on the head-mounted display (HMD) device. In some examples, specular reflections 933, 934, and 935 of the first, second, and third ornaments may be shimmered as they come into the user's view (but not their gaze focus area, only in the periphery) upon detection of the head rotation providing a more realistic experience. The shimmering effect may be deterministic (i.e., determined by an algorithm based on object size, user gaze focus area, brightness of the scene, etc.) or random.

Figure 9D:
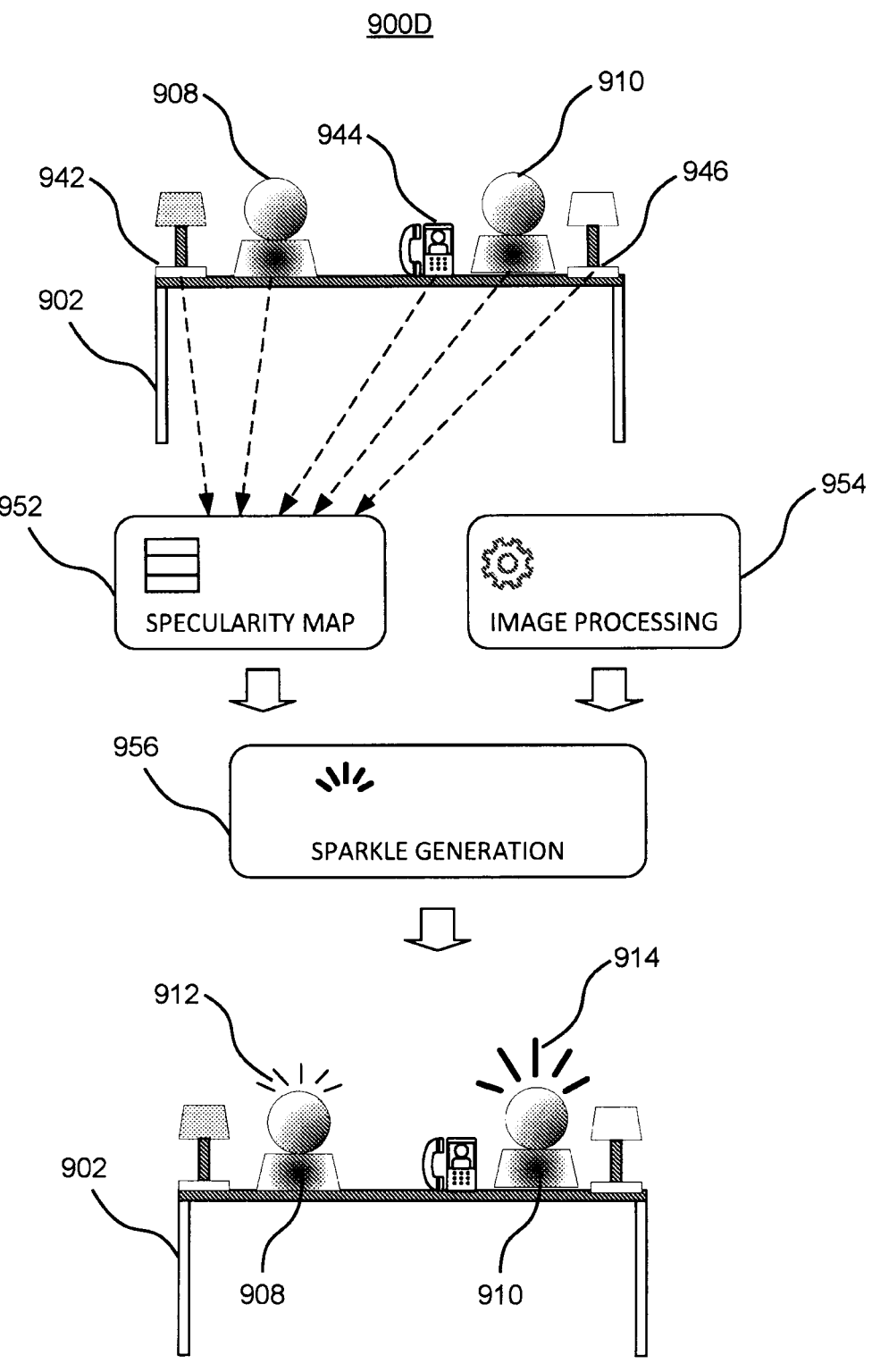

Diagram 900D in FIG. 9D shows a real scene comprising a desk 902 and objects such as first lamp 942, first ornament 908, telephone 944, second ornament 910, and second lamp 946 thereon. The diagram also shows how a virtual reality scene comprising the desk 902 with the first and second ornaments 908, 910 with their respective specular reflections 912, 914 may be generated (956) using a specularity map 952 or image processing 954.

As mentioned herein properties such as shape, material, position of an object may create differing sparkles or specular reflections for each object (and parts of the object). A virtual reality system according to examples, may generate those specular reflections in a virtual scene containing the object(s) and modify them to enhance reality perception of a user (e.g., shimmering or adjusting based on user gaze focus area, brightness, etc.). The virtual reality system may, in some examples, receive a specularity map 952 (e.g., in form of metadata associated with each object) that defines specular reflections for each object and/or parts thereof. In other examples, the virtual reality system may perform image processing 954 of the real scene detecting specular reflections of various objects and their parts and associating those specular reflections with identified objects (and their parts). The system may then generate (and adjust as needed) specular reflections for the objects in the virtual reality scene.

In some examples, upon performing image processing 954 and determining specular reflections of various identified objects, the virtual reality system may store at or forward to, the object/specular reflection information, a database that may contain a specular map.

In some examples, tone mapping implemented on images for the left and right eyes may be slightly different to further enhance global and local contrast. When content seen by the eyes individually are fused, not only is linear blending performed in the brain, but a non-linear effect may also occur retaining higher contrast, sharply focused, and brighter content. On the left sight darker portion of the image may be emphasized, on the right eye lighter portion, and the brain may blend them for clearer image. Thus, dichoptic specular effect may be implemented based on specular extraction by a machine learning (ML) algorithm or based on metadata. A tone mapping curve may be adjusted for both eyes to receive reasonable difference. Highlights may be presented at peaks of the curve to each eye providing more emphasis. Furthermore, a glistering effect may be created by generating spikes along edges (e.g., edges of clothes) to emulate the glistering effect. The spikes may be changed or alternated dynamically based on a user's gaze direction.

Figure 10:
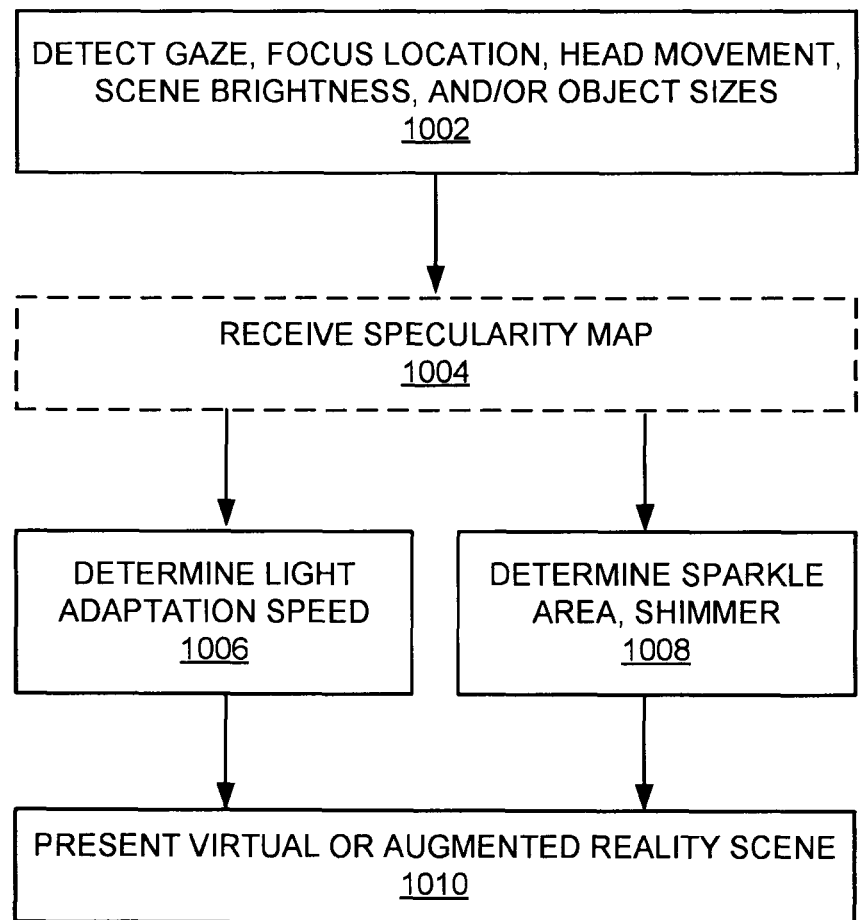
FIG. 10 illustrates a flow diagram for a method of generating sparkles, according to some examples.

FIG. 10 illustrates a flow diagram for a method of generating sparkles, according to some examples. The method 1000 is provided by way of example, as there may be a variety of ways to carry out the method described herein. Although the method 1000 is primarily described as being performed by the components of FIGS. 1, 2A-2C, and 4, the method 1000 may be executed or otherwise performed by one or more processing components of another system or a combination of systems. Each block shown in FIG. 10 may further represent one or more processes, methods, or sub-routines, and one or more of the blocks may include machine readable instructions stored on a non-transitory computer readable medium and executed by a processor or other type of processing circuit to perform one or more operations described herein.

At block 1002, a gaze direction, a gaze focus area, a head movement (including direction), a scene brightness, and/or properties of objects in the scene such as their size, location, shape, material, etc. may be determined by a virtual reality system.

At optional block 1004, a specularity map associated with one or more of the objects in the scene may be received by the virtual reality system. The specularity map may provide specular reflection information for various identified objects (and parts thereof) under different lighting conditions, at different positions, etc., for example. Alternatively, the virtual reality system may determine specular reflections for the objects in the scene based on the information determined at block 1002.

At block 1006, a light adaptation speed may be determined based on a direction of gaze change. For example, if the user's gaze is moving from a brighter portion of the scene to a darker portion, tone adjustment may be performed slower. In contrast, if the user's gaze is moving from the darker portion to the brighter portion of the scene, the tone adjustment may be accelerated.

At block 1008, a sparkle area (specular reflection) for an object or a part thereof may be determined based on a size of the object, whether the object is in a brighter portion or darker portion of the scene, and/or whether the object is in a user gaze focus area or at a periphery. Furthermore, a shimmer effect may be determined based on the same factors and/or a direction of the user's head rotation, so that a realistic sparkle effect can be provided as objects enter and exit the user's view.

At block 1010, a virtual reality scene or an augmented reality scene containing the objects discussed above may be displayed to a user by the virtual reality system providing an enhanced reality perception experience.

According to examples, a method of making a virtual reality system with enhanced reality perception is described herein. A system of making the virtual reality system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A virtual reality system, comprising:
a display;
a processor; and
a memory to store processor-executable instructions that, when executed by the processor, cause the processor to:
determine a user gaze focus area in a scene;
detect at least one object in the scene;
determine a specular reflection for the at least one object;
adjust the specular reflection for the at least one object based on a change in location of the object relative to the user gaze focus area such that:
the specular reflection is increased when the object location is changed relative to the user gaze focus area from a first location within the user gaze focus area to a second location at a periphery of the user gaze focus area, and
the specular reflection is modified to generate a shimmering effect as the object location moves outside the periphery of the user gaze focus area; and
generate a virtual representation of the scene with the at least one object, wherein the virtual representation includes the adjusted specular reflection for the at least one object.

2. The virtual reality system of claim 1, wherein the memory stores further processor-executable instructions to cause the processor to:
determine a brightness of a portion of the scene that includes the at least one object; and
adjust the specular reflection for the at least one object further based on the brightness of the portion of the scene that includes the at least one object.

3. The virtual reality system of claim 1, wherein the memory stores further processor-executable instructions to cause the processor to:
determine a size of the at least one object; and
adjust the specular reflection for the at least one object further based on the size of the at least one object.

4. The virtual reality system of claim 1, wherein the memory stores further processor-executable instructions to cause the processor to:
detect a movement of the user gaze focus area from a first portion of the scene to a second portion of the scene; and
modify a speed of adjustment of the specular reflection based on a relative brightness of the first portion of the scene and the second portion of the scene.

5. The virtual reality system of claim 4, wherein the memory stores further processor-executable instructions to cause the processor to:
detect the first portion of the scene being darker than the second portion of the scene; and
increase the speed of adjustment of the specular reflection in response to the movement of the user gaze focus area from the first portion of the scene to the second portion of the scene.

6. The virtual reality system of claim 4, wherein the memory stores further processor-executable instructions to cause the processor to:
detect the first portion of the scene being brighter than the second portion of the scene; and
decrease the speed of adjustment of the specular reflection in response to the movement of the user gaze focus area from the first portion of the scene to the second portion of the scene.

7. The virtual reality system of claim 1, wherein the processor determines the specular reflection for the at least one object by receiving a specularity map that includes at least specular reflection properties associated with a plurality of objects.

8. The virtual reality system of claim 1, wherein the processor determines the specular reflection for the at least one object by processing an image of the scene.

9. The virtual reality system of claim 1, wherein the memory stores further processor-executable instructions to cause the processor to:

detect a movement of the user gaze focus area due to a rotation of a user's head;

detect a plurality of objects entering and exiting the periphery of the user gaze focus area as the user's head rotates; and modify specular reflections of the plurality of objects as the objects enter and exit the periphery of the user gaze focus area to generate the shimmering effect on the plurality of objects.

10. The virtual reality system of claim 9, wherein specular reflections of the plurality of objects are modified deterministically or randomly.

11. A method, comprising:

determining a user gaze focus area in a real scene;

detecting at least one object in the real scene;

determining a specular reflection for the at least one object based on a specular map or processing of an image of the real scene;

adjusting the specular reflection for the at least one object based on a change in location of the object relative to the user gaze focus area such that:

the specular reflection is increased when the object location is changed relative to the user gaze focus area from a first location within the user gaze focus area to a second location at a periphery of the user gaze focus area, and the specular reflection is modified to generate a shimmering effect as the object location moves outside the periphery of the user gaze focus area; and generating a virtual scene with the at least one object, wherein the virtual scene includes the adjusted specular reflection for the at least one object.

12. The method of claim 11, further comprising:

determining at least one of a brightness of a portion of the real scene that includes the at least one object or a size of the at least one object; and adjusting the specular reflection for the at least one object further based on at least one of the brightness of the portion of the real scene that includes the at least one object or the size of the at least one object.

13. The method of claim 11, further comprising:

detecting a movement of the user gaze focus area from a first portion of the virtual scene to a second portion of the virtual scene, wherein a corresponding first portion of the real scene is darker than a corresponding second portion of the real scene; and increasing a speed of adjustment of the specular reflection in response to the movement of the user gaze focus area from the first portion of the virtual scene to the second portion of the virtual scene.

14. The method of claim 11, further comprising:

detecting a movement of the user gaze focus area from a first portion of the virtual scene to a second portion of the virtual scene, wherein a corresponding first portion of the real scene is brighter than a corresponding second portion of the real scene; and decreasing a speed of adjustment of the specular reflection in response to the movement of the user gaze focus area from the first portion of the virtual scene to the second portion of the virtual scene.

15. The method of claim 11, further comprising:

detecting a movement of the user gaze focus area due to a rotation of a user's head;

detecting a plurality of objects entering and exiting the periphery of the user gaze focus area as the user's head rotates; and modifying specular reflections of the plurality of objects deterministically or randomly as the objects enter and exit the periphery of the user gaze focus area to generate the shimmering effect on the plurality of objects.

16. A non-transitory computer readable storage medium comprising an executable that, when executed, instructs a processor to:

determine a user gaze focus area in a real scene; detect at least one object in the real scene;

determine at least one of a brightness of a portion of the real scene that includes the at least one object or a size of the at least one object;

determine a specular reflection for the at least one object based on a specular map or processing of an image of the real scene;

adjust the specular reflection for the at least one object based on at least one of a change in location of the object relative to the user gaze focus area such that:

the specular reflection is increased when the object location is changed relative to the user gaze focus area from a first location within the user gaze focus area to a second location at a periphery of the user gaze focus area, and the specular reflection is modified to generate a shimmering effect as the object location moves outside the periphery of the user gaze focus area; and generate a virtual scene with the at least one object, wherein the virtual scene includes the adjusted specular reflection for the at least one object.

17. The non-transitory computer readable storage medium of claim 16, wherein the executable further causes the processor to determine a gaze direction and a size of the user gaze focus area.

18. The non-transitory computer readable storage medium of claim 17, wherein the executable further causes the processor to determine a brightness of the user gaze focus area relative to an average brightness of the real scene.

19. The non-transitory computer readable storage medium of claim 16, wherein the executable further causes the processor to:

detect a movement of the user gaze focus area from a first portion of the virtual scene to a second portion of the virtual scene, wherein a corresponding first portion of the real scene is darker than a corresponding second portion of the real scene; and increase a speed of adjustment of the specular reflection in response to the movement of the user gaze focus area from the first portion of the virtual scene to the second portion of the virtual scene.

20. The non-transitory computer readable storage medium of claim 16, wherein the executable further causes the processor to:

detect a movement of the user gaze focus area from a first portion of the virtual scene to a second portion of the virtual scene, wherein a corresponding first portion of the real scene is brighter than a corresponding second portion of the real scene; and decrease a speed of adjustment of the specular reflection in response to the movement of the user gaze focus area from the first portion of the virtual scene to the second portion of the virtual scene.

\*  \*  \*  \*  \*